US008175303B2

(12) United States Patent
Sawashi et al.

(10) Patent No.: US 8,175,303 B2

(45) Date of Patent: May 8, 2012

(54) ELECTRONIC APPARATUS FOR VEHICLE, AND METHOD AND SYSTEM FOR OPTIMALLY CORRECTING SOUND FIELD IN VEHICLE

(75) Inventors: Tokihiko Sawashi, Tokyo (JP); Yasuyuki Kino, Tokyo (JP); Toshiaki Kobayashi, Saitama (JP)

(73) Assignee: Sony Corporation, Tokyo (JP)

( * ) Notice: Subject to any disclaimer, the term of this patent is extended or adjusted under 35 U.S.C. 154(b) by 1178 days.

(21) Appl. No.: 11/717,059

(22) Filed: Mar. 13, 2007

(65) Prior Publication Data

US 2007/0263880 A1 Nov. 15, 2007

(30) Foreign Application Priority Data

Mar. 29, 2006 (JP) ................................ 2006-091691

(51) Int. Cl.

*H04R 5/02* (2006.01)
*H04B 1/00* (2006.01)
*H04R 29/00* (2006.01)
*H04R 5/00* (2006.01)

(52) U.S. Cl. .......... 381/302; 381/86; 381/300; 381/303; 381/59; 381/17; 381/18

(58) Field of Classification Search .............. 381/17–18, 381/59, 86, 300, 302, 303, 310
See application file for complete search history.

(56) References Cited

U.S. PATENT DOCUMENTS 4,538,295 A * 8/1985 Noso et al. .................... 704/248
4,586,195 A * 4/1986 DeGeorge et al. .............. 381/92
5,692,055 A * 11/1997 Sano et al. ................. 381/71.11
2003/0031333 A1* 2/2003 Cohen et al. .................. 381/303
2005/0265559 A1* 12/2005 Asada ............................. 381/18

FOREIGN PATENT DOCUMENTS

JP 1994-046499 2/1994
JP 1995-274282 10/1995
JP 1998-248098 9/1998
JP 2003-516687 5/2003
JP 2005-341384 12/2005

* cited by examiner

*Primary Examiner* — Devona Faulk
*Assistant Examiner* — George Monikang
(74) *Attorney, Agent, or Firm* — Finnegan, Henderson, Farabow, Garrett & Dunner, L.L.P.

(57) ABSTRACT

A sound field in a vehicle can be further readily and optimally corrected without forcing a user to do troublesome work. As an embodiment of the present invention, a measurement sound emitted through a left speaker or a right speaker at a further position in a view from a driver's listening point that was assumed on the head touching surface of the headrest of the driver's seat or the passenger seat is picked up, with a microphone provided as buried on a front panel of a head unit to be attached to the almost center position between the driver's seat and the passenger seat in the vehicle. And the frequency characteristic of the above sound is corrected, based on a tendency that the frequency characteristic of an audio sound reaching from the left speaker or the right speaker to the microphone is almost approximate to the virtual frequency characteristic of an audio sound that will reach from the left speaker or the right speaker to the driver's listening point assumed on the head touching surface.

12 Claims, 12 Drawing Sheets

ELECTRONIC APPARATUS FOR VEHICLE, AND METHOD AND SYSTEM FOR OPTIMALLY CORRECTING SOUND FIELD IN VEHICLE

CROSS REFERENCE TO RELATED APPLICATION

The present invention contains subject matter related to Japanese Patent Application JP 2006-091691 filed in the Japanese Patent Office on Mar. 29, 2006, the entire contents of which being incorporated herein by reference.

BACKGROUND OF THE INVENTION

1. Field of the Invention

The present invention relates to electronic apparatus for vehicle, a method for optimally correcting a sound field in a vehicle, and a sound field optimum correction system in a vehicle, and is applicable to a head unit of vehicle audio to be attached to a center console panel at the almost center between the driver's seat and the passenger seat in a vehicle, for example.

2. Description of the Related Art

Heretofore, in a vehicle audio system, even if audio reproducing is performed in a vehicle, a listening point is not at the center between a left speaker and a right speaker, and is shifted to either of the driver's seat or the passenger seat.

Thus, in such listening point, distances from each speaker to the above listening point are respectively different, so that also the frequency characteristics of sounds from each speaker and those of sounds at each listening point are respectively different. Therefore, it has been in a situation that it is hard to say a user listens to audio at the optimum listening position.

To solve this, a sound field correcting apparatus in which correction information on at least two normal correcting positions is obtained, and correction information on a correcting position other than the normal correcting positions is obtained by operation using that information has been proposed (see Japanese Patent Laid-Open No. 2005-341384, for example).

Further, in a vehicle audio system, audio signal waves are reflected in a vehicle owing to the form of the vehicle space. The audio signal waves and the reflected waves interfere with each other, so that standing waves are generated. Therefore, the frequency characteristic is apt to be disturbed.

To improve such listening environment, "vehicle audio system adjustable by equalizer" and "vehicle audio system capable of time alignment adjustment" in that a measurement microphone is installed at a listening point, a sound reaching time from each speaker installed in a vehicle is measured, and the output timings of sounds by each speaker are controlled, so that the phase of a sound wave from each speaker is adjusted properly, and the disturbance of the frequency characteristic of the each sound wave by interference is restrained has been developed.

With respect to such equalizer adjustment and time alignment adjustment, there are two ways of the case where it is manually performed based on sound field data measured in a vehicle relying on the sense of hearing of people, and the case where a vehicle audio system itself automatically performs processing from sound field measurement to reflecting the result.

SUMMARY OF THE INVENTION

By the way, in a vehicle audio system having the above configuration, even if the processing from sound field measurement to reflecting the result is automatically performed, a microphone dedicated to measurement installed at a listening point is necessary together with the above vehicle audio system. There has been a problem that a user is forced to do troublesome work to connect a microphone cable of 1 m or more to the microphone dedicated to measurement and install the microphone at a listening point on the driver's seat or the passenger seat.

In view of the foregoing, it is desirable to provide electronic apparatus for vehicle, a method for optimally correcting a sound field in a vehicle, and a sound field optimum correction system in a vehicle that can further simply optimally correct a sound field in a vehicle without forcing a user to do troublesome work.

Electronic apparatus for vehicle, a method for optimally correcting a sound field in a vehicle, and a sound field optimum correction system in a vehicle according to an embodiment of the present invention are applicable to the case of improving the listening environment in a narrow indoor space in that a head unit is provided at the almost center between a left speaker and a right speaker, and a listening position is at a position slightly shifted from the front of the head unit, for example.

According to an embodiment of the present invention, there is provided electronic apparatus for vehicle to be attached to a front console panel at the almost center between the driver's seat and the passenger seat in a vehicle, and a method for optimally correcting a sound field in the vehicle by the above electronic apparatus for vehicle. In the electronic apparatus and the method, a sound emitted through a left speaker or a right speaker at a further position in a view from a listening point that was assumed on the front of the headrest of the driver's seat or the passenger seat in the vehicle is picked up with a microphone provided on a front panel of the electronic apparatus for vehicle. And the frequency characteristic of the above sound is corrected, based on a tendency that the frequency characteristic of an audio sound reaching from the left speaker or the right speaker to the microphone through the front panel is almost approximate to the virtual frequency characteristic of an audio sound that will reach from the left speaker or the right speaker to the listening point assumed on the front of the headrest.

Thereby, by using being a tendency for that the frequency characteristic of an audio sound picked up with the microphone provided on the front panel of the electronic apparatus for vehicle is almost approximate to the virtual frequency characteristic of an audio sound that will reach from the left speaker or the right speaker to the listening point assumed on the front of the headrest, the virtual frequency characteristic of the sound that will reach from the left speaker or the right speaker to the listening point assumed on the front of the headrest can be corrected, only by correcting the frequency characteristic of the sound picked up with the above microphone. Therefore, the virtual frequency characteristic of an audio sound at the listening point assumed on the front of the headrest can be arbitrary adjusted, without forcing a user to do troublesome work.

Further, according to an embodiment of the present invention, there is provided a sound field optimum correction system in a vehicle formed by electronic apparatus for vehicle to be attached to a front console panel at the almost center between the driver's seat and the passenger seat in the vehicle, and a left speaker and a right speaker provided on the left side and the right side in a view from a listening point assumed on the front of the headrest of the driver's seat or the passenger seat in the vehicle. In the system, an audio sound emitted through a left speaker or a right speaker at a further position in a view from a listening point that was assumed on the front of the headrest of the driver's seat or the passenger seat in the vehicle is picked up with a microphone provided on a front panel of the electronic apparatus for vehicle. And the frequency characteristic of the above sound is corrected, based on a tendency that the frequency characteristic of an audio sound reaching from the front left speaker or the front right speaker to the microphone through the front panel is almost approximate to the virtual frequency characteristic of an audio sound that will reach from the left speaker or the right speaker to the listening point assumed on the front of the headrest.

Thereby, by using being a tendency for that the frequency characteristic of an audio sound picked up with the microphone provided on the front panel of the electronic apparatus for vehicle is almost approximate to the virtual frequency characteristic of an audio sound that will reach from the left speaker or the right speaker to the listening point assumed on the front of the headrest, the virtual frequency characteristic of the sound that will reach from the left speaker or the right speaker to the listening point assumed on the front of the headrest can be corrected, only by correcting the frequency characteristic of the sound picked up with the above microphone. Therefore, the virtual frequency characteristic of an audio sound at the listening point assumed on the front of the headrest can be arbitrary adjusted, without forcing a user to do troublesome work.

The nature, principle and utility of the present invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings:

(1) Configuration of Sound Field Optimum Correction System

Figure 1:
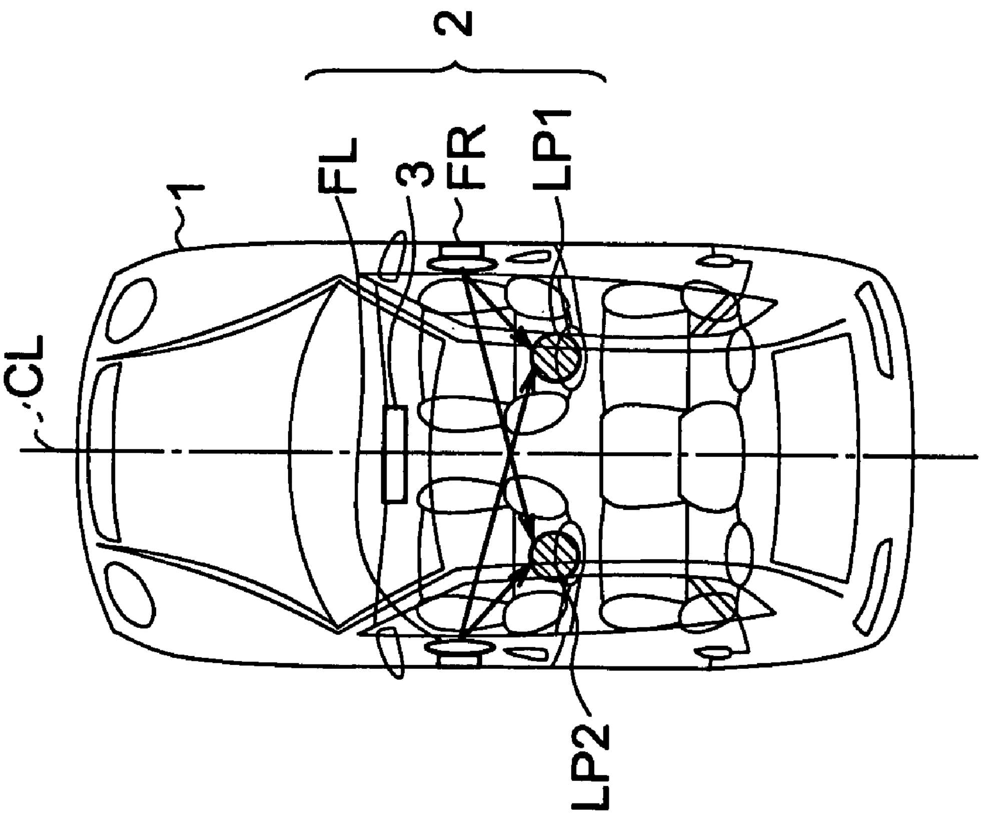
FIG. 1 is a schematic diagram showing the overall configuration of a sound field optimum correction system according to an embodiment of the present invention.

Referring to FIG. 1, the reference numeral 1 designates a vehicle mounting a sound field optimum correction system 2 of an embodiment of the present invention as a whole. The above sound field optimum correction system 2 is formed by a front right speaker FR provided in a door on the driver's seat side, a front left speaker FL provided in a door on the passenger seat side, and a head unit 3 used as a vehicle audio reproducing apparatus such as Compact Disc (CD) player, and Digital Versatile Disc (DVD) player. This head unit 3 is attached to a front console panel at the almost center between the driver's seat and the passenger seat.

Figure 2:
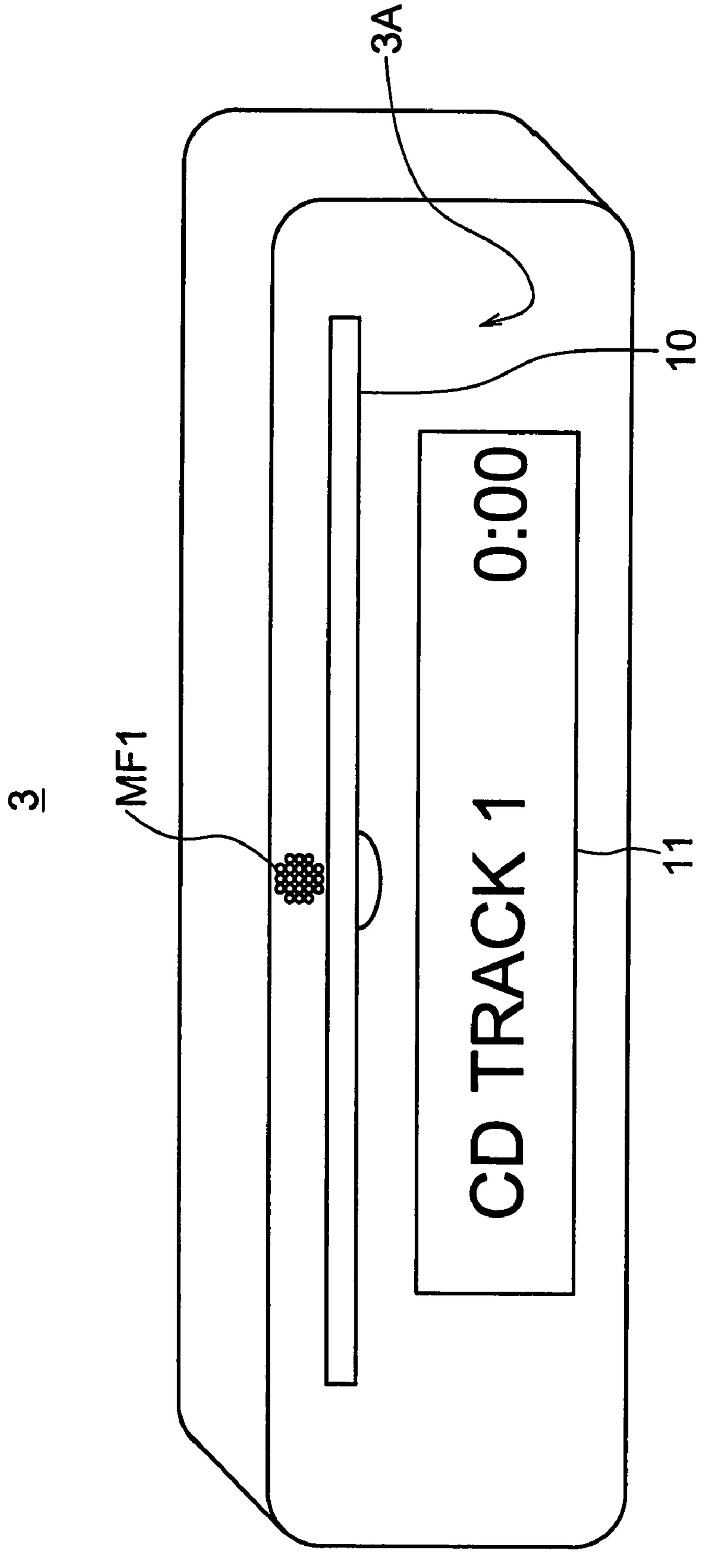
FIG. 2 is a schematic diagram showing the configuration of a head unit.

Further, as shown in FIG. 2, in the head unit 3, an insertion hole 10 of a CD or a DVD, and a display part 11 for displaying various information such as a reproducing track number and a reproducing time are provided on the front panel 3A. And also, at the almost center upper part of the front panel 3A, a nondirective microphone MF1 to realize the hands free function of a cellular phone is provided as buried. The above microphone MF1 is used for sound field correction.

In this connection, as the microphone MF1, it is absolutely unnecessary to be nondirective. It may have directivity of approximately 180 degrees centering the front panel 3A, in a degree that it can pick up sounds emitted from the front left speaker FL or the front right speaker FR.

In this sound field optimum correction system 2 (FIG. 1), if assuming the head touching surface of the headrest of the driver's seat as a driver's listening point LP1, and the head touching surface of the headrest of the passenger seat as a passenger's listening point LP2, only the frequency characteristic fHU of an audio sound reaching from the front left speaker FL to the microphone MF1 that is provided as buried in the front panel 3A of the head unit 3 is practically measured. And the optimum listening environment for a driver at the driver's listening point LP1 and a passenger being at the passenger's listening point LP2 can be provided based on the measurement result. It is considered that a user is not forced to do troublesome work such as installing microphones dedicated to measurement in the driver's seat and the passenger seat as conventional one. A configuration for that will be described concretely.

Figure 3:
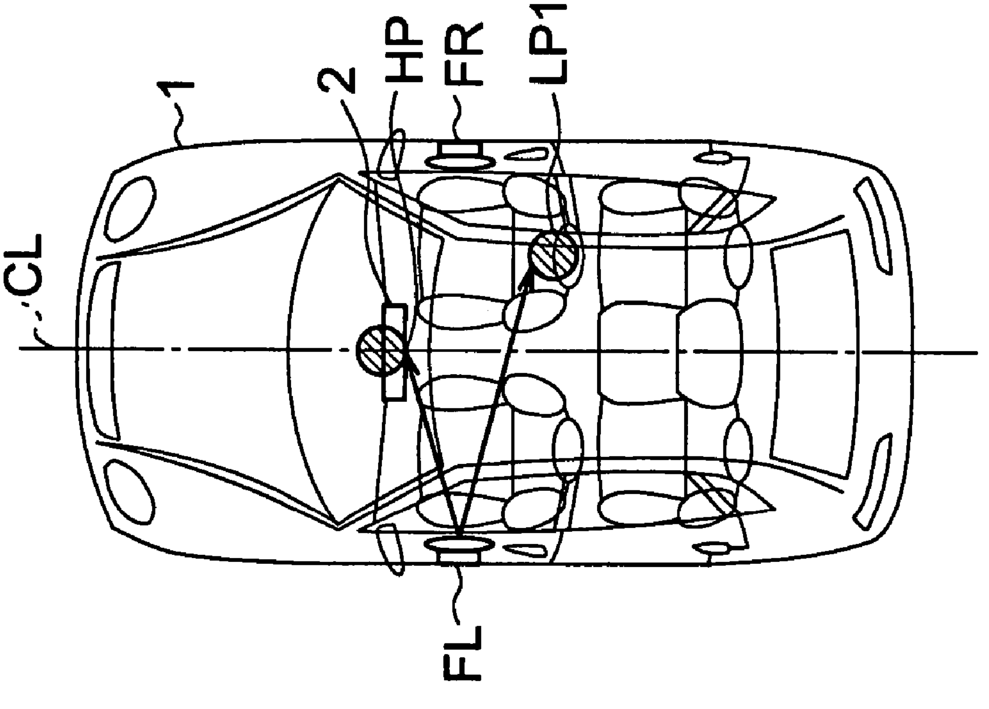
FIG. 3 is a schematic diagram for explaining a measuring point.

As shown in FIG. 3, in the sound field optimum correction system 2, a difference in both their frequency characteristics is first inspected between the case where a measurement sound based on a measuring signal for sound field correction (Time Stretched Pulse (TSP) signal, for example) emitted only from the front left speaker FL via the head unit 3 was picked up at the driver's listening point LP1, and the case where a measurement sound based on a TSP signal emitted only from the front left speaker FL was picked up with the microphone MF1 provided as buried in the front panel 3A of the head unit 3 (at a head unit point HP).

Figure 4:
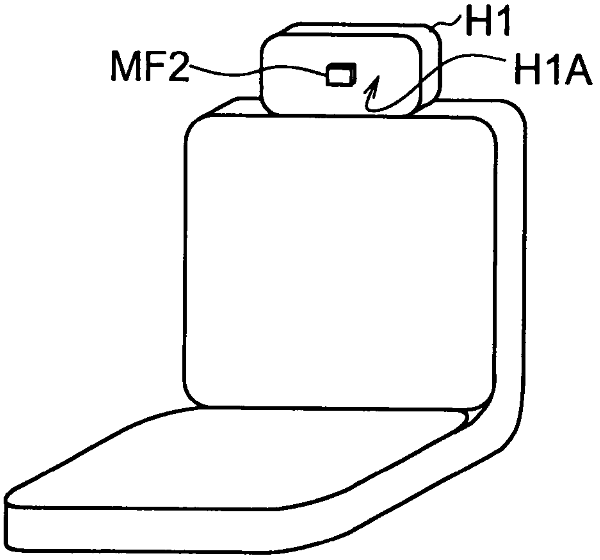
FIG. 4 is a schematic perspective view showing an installation position of a microphone.

In this case, in the sound field optimum correction system 2, in the case of picking up a measurement sound at the driver's listening point LP1, as shown in FIG. 4, it is made a condition that a measurement microphone MF2 installed on the head touching surface H1A of the headrest H1 of the driver's seat is used.

Here, the TSP signal used for sound field correction is a signal to measure an impulse response, and is a signal obtained by stretching the frequency of a sine wave from high frequency to low frequency for a short time and continuously performing sweep output. However, the measuring signal for sound field correction is not only limited to the TSP signal but also other various signals such as an M series signal may be used.

Practically, when the frequency characteristic fDL of a measurement sound reaching only from the front left speaker FL that was picked up with the measurement microphone MF2 installed on the head touching surface H1A of the headrest H1 of the driver's seat (at the driver's listening point LP1) was compared to the frequency characteristic fHU of a measurement sound reaching only from the front left speaker FL that was measured with the microphone MF1 in the head unit 3 (FIG. 3) (at the head unit point HP), comparison results shown in FIGS. 5A to 5D were obtained.

That is, as shown in FIGS. 5A to 5D, although the four comparison results are all different in vehicle type, it was proved that the general patterns are almost same between the frequency characteristic fDL of the front left speaker FL at the head unit point HP and the frequency characteristic fHU of the front left speaker FL at the driver's listening point LP1, and both of the frequency characteristic fHU at the head unit point HP and the frequency characteristic fDL at the driver's listening point LP1 do not have large difference and are extremely approximate. Next, the verification will be performed.

Here, it is considered that generally, as to the vehicle space of a vehicle 1, the characteristics are approximate even in different vehicle type, compared to the sound environment in an indoor space in that home audio apparatus is installed or the like. A main target vehicle type capable of installing the head unit 3 serving as a vehicle audio reproducing apparatus is equivalent to "normal vehicle" in the classification in Japan (according to the Road Trucking Vehicle Law. The "normal vehicle" means a vehicle of which the passenger capacity is 10 or less such as a 3 number plate vehicle and a 5 number plate vehicle). As to the vehicle width, the almost all of the normal vehicles except for track or the like are within approximately 0.1.5 m to approximately 1.9 m.

Further, even if adding "light vehicles" in the classification in Japan, the vehicle width is approximately 1.4 m to approximately 1.9 m degree. All of them are concentrated in a slight difference of 50 cm degree. Furthermore, also as to the height dimension of the vehicle space, almost all of the "normal vehicles" are within approximately 1 m to approximately 1.5 m degree.

Not only that, the driver's seat and the passenger seat (sometimes a bench seat) are installed at the front in the vehicle. Generally, each the seat is arranged in the form of almost symmetry with the center line CL in the longitudinal direction of the vehicle 1 (FIGS. 1 and 3). In any vehicle 1, a steering wheel is equipped on the driver's seat. Therefore, if only considering the vehicle width, a dimensional difference from the center line CL is only approximately 25 cm degree at maximum.

The vehicles 1 are agree in many characteristics within the dimensional difference of approximately 50 cm degree irrespective of vehicle type as the above. Therefore, it is inferred that even in different vehicle types, more particularly, they have a mutually common tendency in sound field characteristics near the driver's seat and the passenger seat.

Accordingly, as shown in FIGS. 5A to 5D, as to that the overall patterns of the frequency characteristic are almost common even in different vehicle types, it is considered that it is because irrespective of different vehicle types, the vehicle spaces of the vehicle 1 are essentially same.

On the other hand, as to the reason that there is not almost a difference between the frequency characteristic fHU at the head unit point HP of the head unit 3 and the frequency characteristic fDL at the driver's listening point LP1 of the headrest H1, and they are extremely approximate, it is considered to be based on that the positional relationship between the front left speaker FL and the microphone MF1 of the head unit 3, and the arrangement relationship between the front left speaker FL and the measurement microphone MF2 in the headset H1 are approximate.

Figure 6:
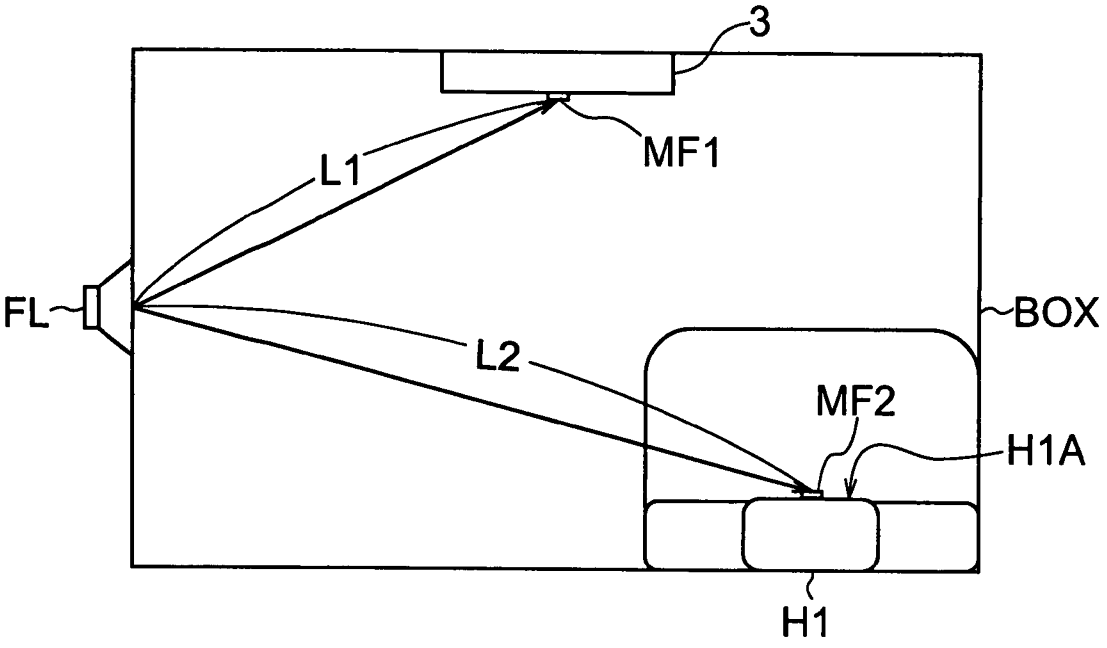
FIG. 6 is a schematic diagram for explaining the positional relationship of a head unit and a listening point to a speaker.
Figure 5A:
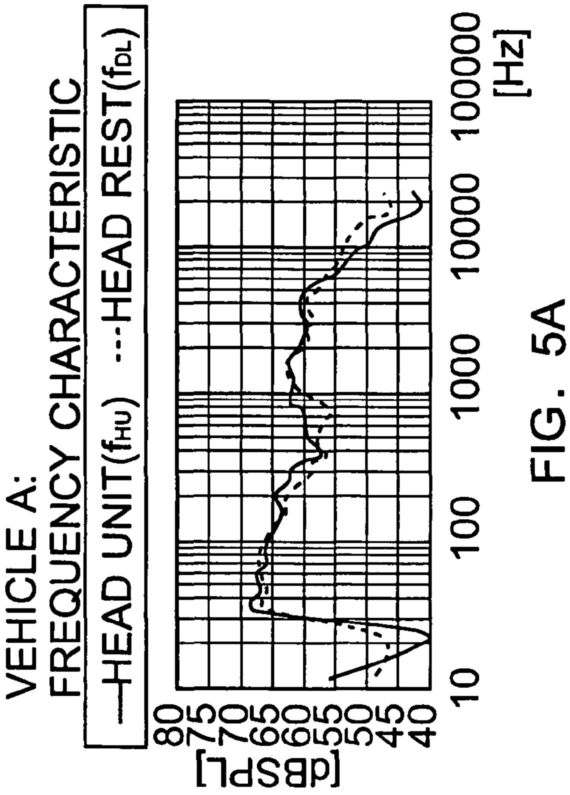
FIGS. 5A to 5D are characteristic curvilinear diagrams showing a frequency characteristic in each vehicle type.
Figure 5B:
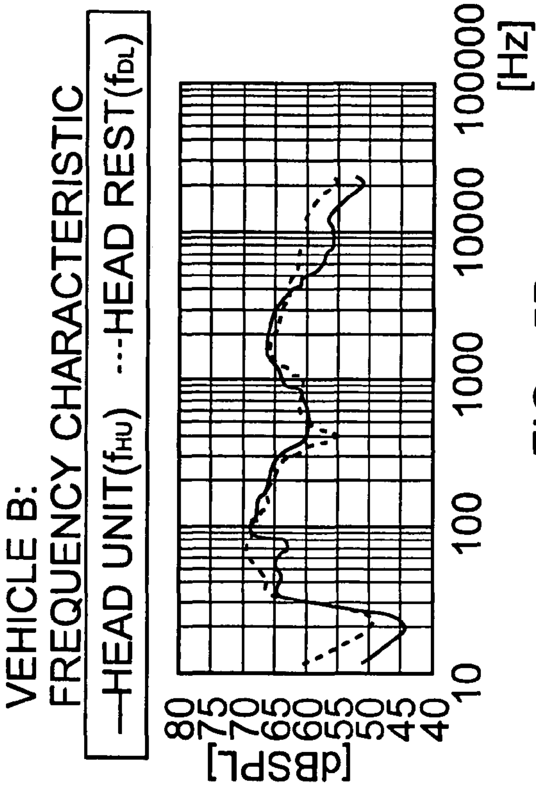
Figure 5C:
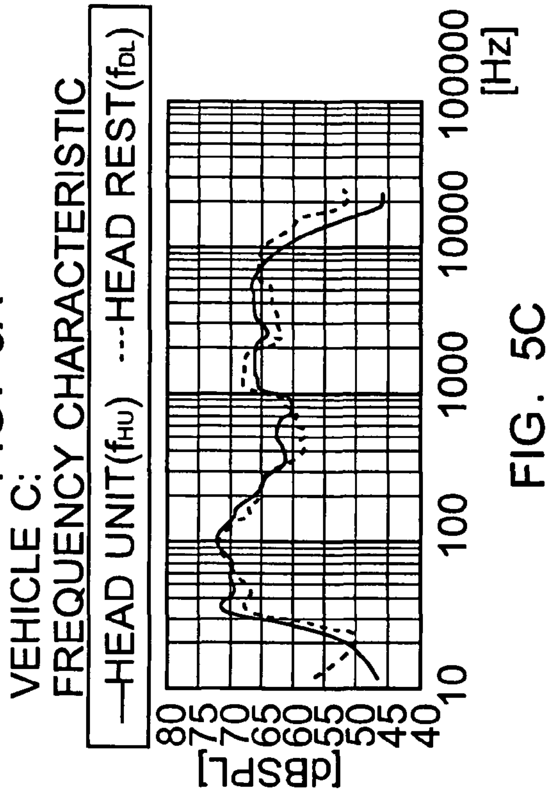
Figure 5D:
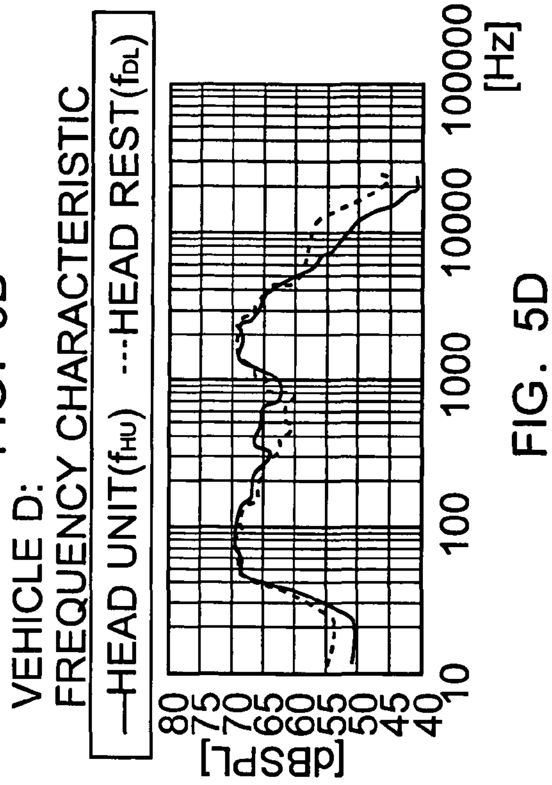
Figure 7A:
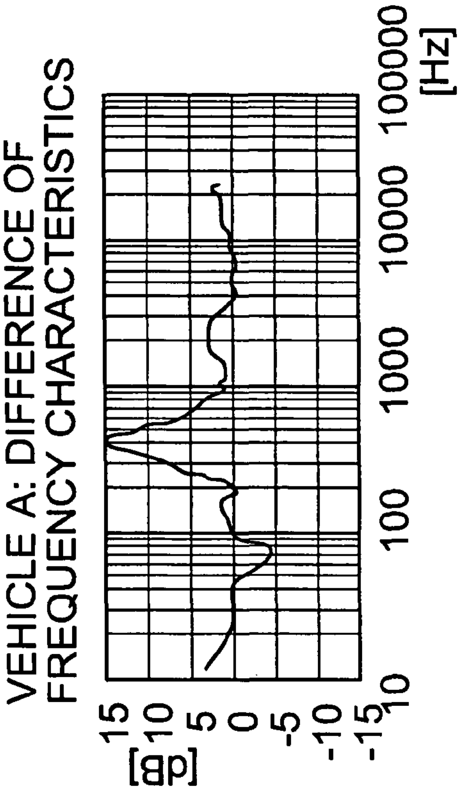
FIGS. 7A to 7D are characteristic curvilinear diagrams showing a difference of frequency characteristics between a front left speaker and a front right speaker.
Figure 7B:
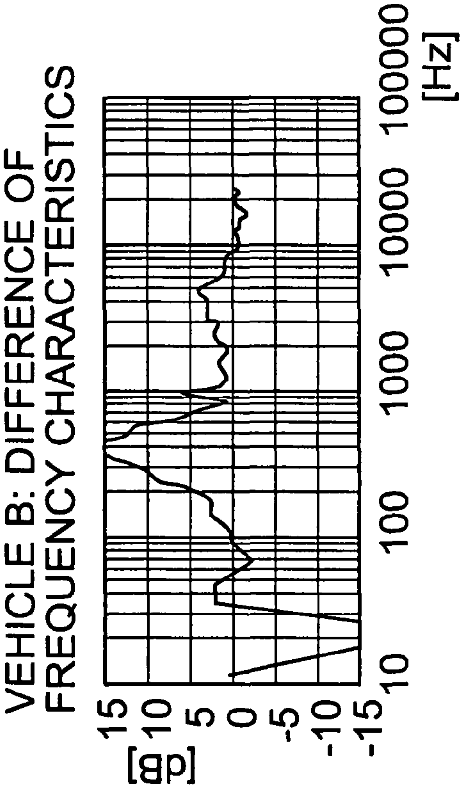
Figure 7C:
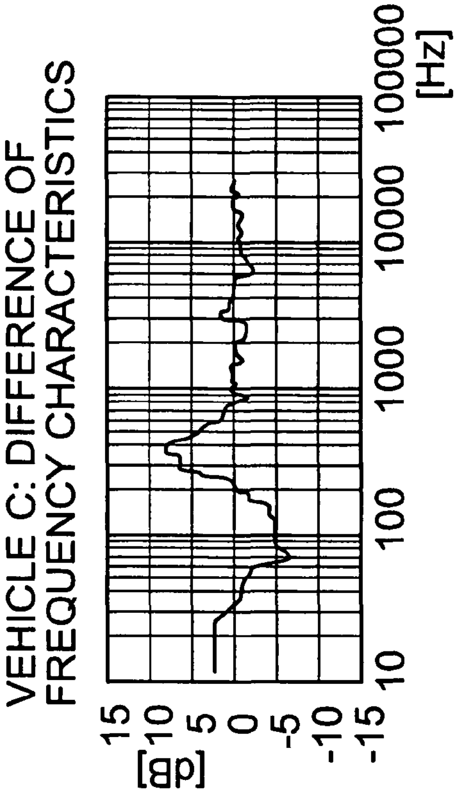
Figure 7D:
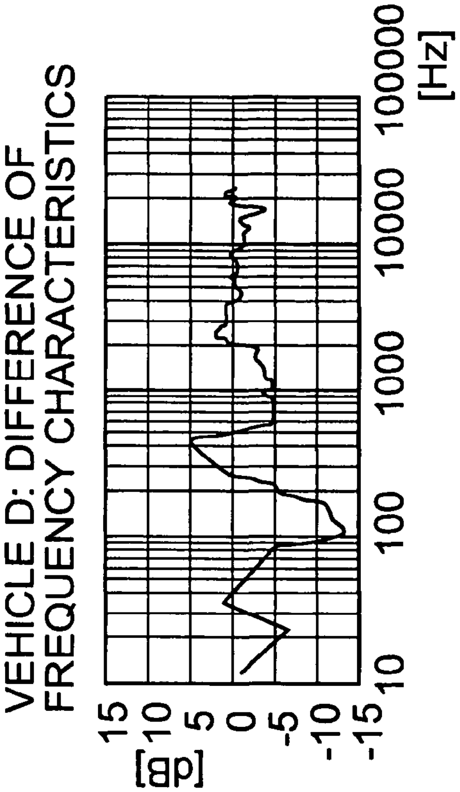

Here, as shown in FIG. 6, a distance L1 from the front left speaker FL to the microphone MF1 provided as buried in the front panel 3A of the head unit 3 (the head unit point HP) is different from a distance L2 from the front left speaker FL to the measurement microphone MF2 attached to the headrest H1 (the driver's listening point LP1), and the relationship $L1<L2$ is satisfied. Therefore, to be exact, it is natural that the frequency characteristic fHU at the head unit point HP of the head unit 3 is different from the frequency characteristic fDL at the driver's listening point LP1 of the headrest H1.

However, if assuming one virtual sound space BOX formed by the front left speaker FL, the head unit 3 and the headrest H1, a measurement sound reaching from the front left speaker FL is reflected to the front panel 3A of the head unit 3 as a wall, and a measurement sound reaching from the front left speaker FL is reflected to the head touching surface H1A of the headrest H1 as a wall. Therefore, in a view from the front left speaker FL, the head unit point HP of the head unit 3 and the driver's listening point LP1 of the headrest H1 are in the sound environment in that sounds are similarly reflected.

Further, though the distance L1 from the front left speaker FL to the microphone MF1 provided as buried in the front panel 3A of the head unit 3 is not equal to the distance L2 from the front left speaker FL to the measurement microphone MF2 attached to the headrest H1, it is a thing only within a limited vehicle width that is the vehicle space of a vehicle. The difference between the distance L1 and the distance L2 is approximately 25 cm degree even at maximum, and it is not so large. It can be said that if viewing from the front left speaker FL, they are in the almost symmetrical positional relationship.

Therefore, in the sound field optimum correction system 2, the frequency characteristic fHU of a measurement sound reaching only from the front left speaker FL to the microphone MF1 provided as buried in the front panel 3A of the head unit 3 is simulated. And the frequency characteristic fHU at the head unit point HP can be used as the frequency characteristic fDL of a measurement sound reaching from the front left speaker FL at the driver's listening point LP1 of the headrest H1.

At this time, in the sound field optimum correction system 2, if it is considered similarly, also at the passenger's listening point LP2 on the passenger seat, the positional relationship between the front right speaker FR and the microphone MF1 of the head unit 3, and the arrangement relationship between the front right speaker FR and the measurement microphone MF2 of the headrest H1 are approximate. Therefore, the frequency characteristic fHU of the head unit point HP obtained by simulating the measurement sound reaching from the front left speaker FL to the microphone MF1 provided as buried in the front panel 3A of the head unit 3 can be used as the frequency characteristic fPR of a measurement sound reaching from the front right speaker FR at the passenger's listening point LP2.

That is, in the sound field optimum correction system 2, the frequency characteristic fHU obtained by only once simulating the measurement sound reaching only from the front left speaker FL by the microphone MF1 provided as buried in the front panel 3A of the head unit 3 can be used as the virtual frequency characteristic fDLK of the front left speaker FL at the driver's listening point LP1, without installing a measurement microphone on the head touching surface H1A of the headrest H1 of the driver's seat.

Similarly, in the sound field optimum correction system 2, the frequency characteristic fHU obtained by only once simulating the measurement sound reaching only from the front left speaker FL by the microphone MF1 provided as buried in the front panel 3A of the head unit 3 can be used as the virtual frequency characteristic fPRK of the front right speaker FR at the passenger's listening point LP2, without installing a measurement microphone on the head touching surface of the headrest of the passenger seat.

However, at this point in time, although the virtual frequency characteristic fDLK of the measurement sound that will reach from the front left speaker FL to the driver's listening point LP1 on the driver's seat, and the virtual frequency characteristic fPRK of the measurement sound that will reach from the front right speaker FR to the passenger's listening point LP2 on the passenger seat could be obtained, the virtual frequency characteristic fDRK of a measurement sound that will reach from the front right speaker FR to the driver's listening point LP1, and the virtual frequency characteristic fPLK of a measurement sound that will reach from the front left speaker FL to the passenger's listening point LP2 cannot be obtained yet.

Then, in the sound field optimum correction system 2, as to the virtual frequency characteristic fDRK of the measurement sound that will reach from the front right speaker FR to the driver's listening point LP1, and the virtual frequency characteristic fPLK of the measurement sound that will reach from the front left speaker FL to the passenger's listening point LP2, they can be obtained by calculation without measuring again by the microphone MF1 in the head unit 3.

Therefore, in the sound field optimum correction system 2 according to an embodiment of the present invention, a measurement microphone is previously installed at the driver's listening point LP1 on the driver's seat, and the practical frequency characteristic fDL of a measurement sound reaching only from the front left speaker FL is detected. Then, the practical frequency characteristic fDR of a measurement sound reaching only from the front right speaker FR to the above driver's listening point LP1 is detected, and the difference of the frequency characteristics D is previously calculated and is previously stored in the head unit 3.

Then, in the sound field optimum correction system 2, when in improving the listening environment only using the head unit 3 without using any measurement microphone or the like, correction is performed by adding this difference of frequency characteristics D to the frequency characteristic fHU that was measured at the head unit point HP of the head unit 3 (that is, the virtual frequency characteristic fDLK of the front left speaker FL at the driver's listening point LP1), so that the virtual frequency characteristic fDRK of the front right speaker FR at the driver's listening point LP1 can be generated.

Similarly, in the sound field optimum correction system 2, when in improving the listening environment only using the head unit 3 without using any measurement microphone or the like, correction is performed by adding this difference of frequency characteristics D to the frequency characteristic fHU that was measured at the head unit point HP of the head unit 3 (that is, the virtual frequency characteristic fPRK of the front right speaker FR at the passenger's listening point LP2), so that the virtual frequency characteristic fPLK of the front left speaker FL at the passenger's listening point LP2 can be generated.

Here, as the aforementioned difference of frequency characteristics D, it can be found that as shown in FIGS. 7A to 7D, although they are different vehicle types, a characteristic that a large gain can be obtained at almost near approximately 400 Hz. This reason is inferred that even in a different vehicle types of the vehicle 1, they have a common tendency in the characteristic of a sound field, irrespective of vehicle type, by the common characteristics and the particular characteristic of the vehicle space.

Note that, as to the gain of the difference of frequency characteristics D stored in the head unit 3, it is a difference between the frequency characteristic fDL of the measurement sound practically reaching only from the front left speaker FL at the driver's listening point LP1 and the frequency characteristic fDR of the measurement sound practically reaching only from the front right speaker FR to the driver's listening point LP1. Therefore, it is a strictly correct value.

By the way, as shown in FIGS. 7A to 7D, the gains of the difference of frequency characteristics D are not common, and they are different depending on vehicle type. More particularly, there is a tendency that in the vehicle 1 having a large vehicle width (the breadth of the vehicle space is large), the gain of the difference of frequency characteristics D is large, and in the vehicle 1 having a small vehicle width, the gain of the difference of frequency characteristics D is small. Therefore, it is ideal that all of the differences of frequency characteristics D for every vehicle type are previously calculated and stored in the head unit 3.

However, in the head unit 3 in the sound field optimum correction system 2, storing all of the differences of frequency characteristics D for every vehicle type is not realistic in the capacity of a memory. Therefore, practically, the gain of the difference of frequency characteristics D is selectively switched whether to be set to a larger value and added or to be set to a smaller value and added, depending on whether or not the distance between the front left speaker FL and the microphone MF1 provided at the head unit point HP of the head unit 3 is over a predetermined threshold value. Thereby, the virtual frequency characteristic fDRK of the front right speaker FR at the driver's listening point LP1 and the virtual frequency characteristic fPLK of the front left speaker FL at the passenger's listening point LP2 are calculated.

In this manner, in the head unit 3, also as to the virtual frequency characteristic fDRK of the front right speaker FR at the driver's listening point LP1 and the virtual frequency characteristic fPLK of the front left speaker FL at the passenger's listening point LP2, they can be immediately obtained by calculation without practically measuring.

Then, in the head unit 3, correction is performed so as to be finally a sound field space desired by a user, by using the virtual frequency characteristic fDLK of the front left speaker FL at the driver's listening point LP1 and the virtual frequency characteristic fDRK of the front right speaker FR at the driver's listening point LP1. Thereby, the listening environment can be improved. Next, the circuit configuration of the head unit 3 that practically performs such processing and a sound field optimum correction processing procedure will be described.

(2) Circuit Configuration of Head Unit

Figure 8:
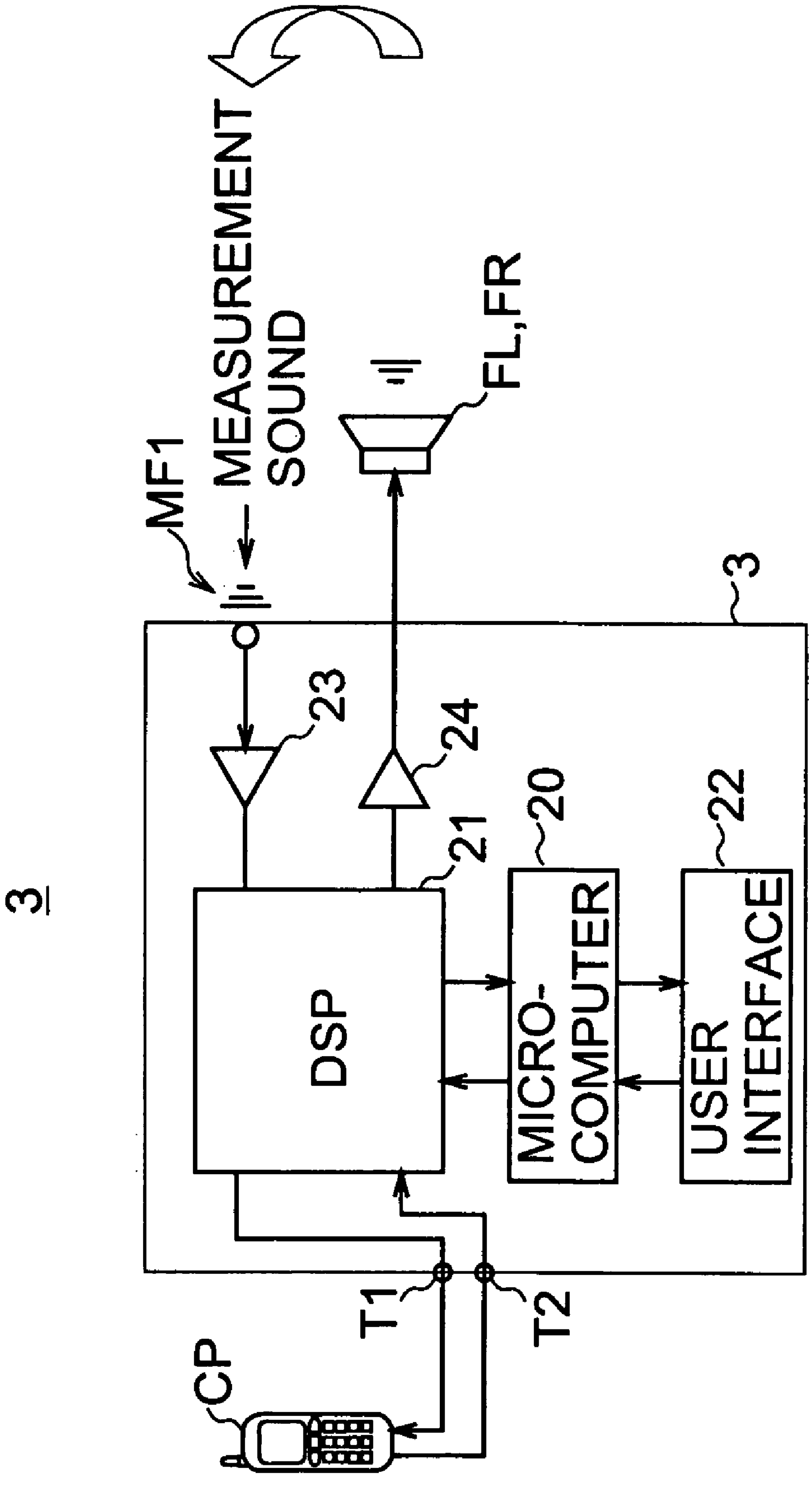
FIG. 8 is a schematic block diagram showing the circuit configuration of a headset.

As shown in FIG. 8, in the head unit 3 in the sound field optimum correction 2, a microcomputer 20 having Central Processing Unit (CPU) configuration integrally controls the whole system. The microcomputer 20 receives various commands supplied from a user interface 22 being various operation buttons on the front panel 3A, and makes Digital Signal Processing (DSP) 21 execute signal processing based on the above various commands. Thereby, reproducing processing or the like of a normal CD or a normal DVD can be executed.

Further, to realize a hands free function, the head unit 3 can be connected to a cellular phone CP via an input and an output terminals T1 and T2. After demodulation processing or the like was performed on an audio signal of the other connecting party supplied from the above cellular phone CP by the DSP 21, the sound of the other connecting party is emitted from the front left speaker FL and the front right speaker FR via an amplifier 24.

On the other hand, in the head unit 3, the voice of a user obtained through the microphone MF1 for realizing the hands free function that is provided as buried in the front panel 3A is taken in the DSP 21 via a microphone amplifier 23. An audio signal obtained by performed predetermined compression coding processing and modulation processing by the above DSP 21 is transmitted in radio from the cellular phone CP to the other connecting party.

By the way, in the head unit 3, to optimally correct a sound field in a vehicle of the vehicle 1, a measurement sound based on a measuring signal for sound field correction is first emitted only from the front left speaker FL. The measurement sound is picked up with the microphone MF1 provided as buried in the front panel 3A. The measuring signal is supplied to the DSP 21 via the microphone amplifier 23.

Figure 9:
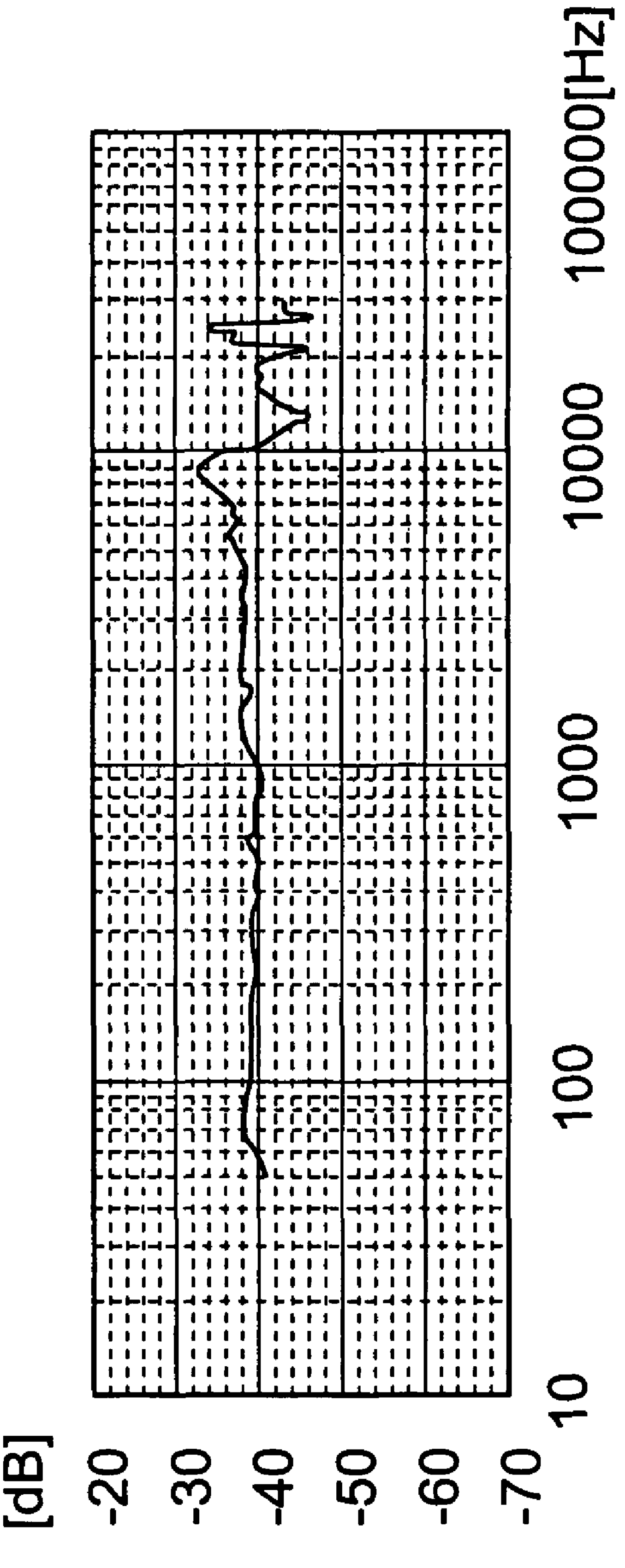
FIG. 9 is a characteristic curvilinear diagram showing a frequency characteristic of a microphone.

Here, as the microphone MF1, as shown in FIG. 9, a microphone having a frequency characteristic that is flat from approximately 70 Hz to near approximately 7 kHz is used. Therefore, even if it is provided as buried in the front panel 3A of the head unit 3, a frequency characteristic in the vehicle in the frequency band from near approximately 70 Hz to near approximately 7 kHz can be sufficiently and certainly measured.

In the microcomputer 20 of the head unit 3, the measuring signal supplied from the microphone amplifier 23 is analyzed by the DSP 21, and a frequency characteristic fHU at the head unit point HP is detected. On recognizing this as the virtual frequency characteristic fDLK of the front left speaker FL at the driver's listening point LP1, the aforementioned difference of frequency characteristics D is added and correction is performed based on that, so that the virtual frequency characteristic fDRK of the front right speaker FR at the driver's listening point LP1 is calculated.

Then, the microcomputer 20 of the head unit 3 corrects the frequency characteristic based on the virtual frequency characteristic fDLK of the front left speaker FL at the driver's listening point LP1 and the virtual frequency characteristic fDRK of the front right speaker FR at the driver's listening point LP1 that were obtained by the DSP 21. Thereby, the optimum listening environment desired by a user at the driver's listening point LP1 can be formed.

Similarly, in the microcomputer 20 of the head unit 3, on recognizing the frequency characteristic fHU at the head unit point HP that was detected by analyzing the measuring signal supplied from the microphone amplifier 23 by the DSP 21 as the virtual frequency characteristic fPRK of the front right speaker FR at the passenger's listening point LP2, the aforementioned difference of frequency characteristics D is added and correction is performed based on that, so that the virtual frequency characteristic fPLK of the front left speaker FL at the passenger's listening point LP2 is calculated.

Then, the microcomputer 20 of the head unit 3 corrects the frequency characteristic based on the virtual frequency characteristic fPRK of the front right speaker FR at the passenger's listening point LP2 and the virtual frequency characteristic fPLK of the front left speaker FL at the passenger's listening point LP2 that were obtained by the DSP 21. Thereby, the optimum listening environment desired by a user at the passenger's listening point LP2 can be formed. Next, such sound field optimum correction processing procedure will be described.

(3) Sound Field Optimum Correction Processing Procedure

Figure 10A:
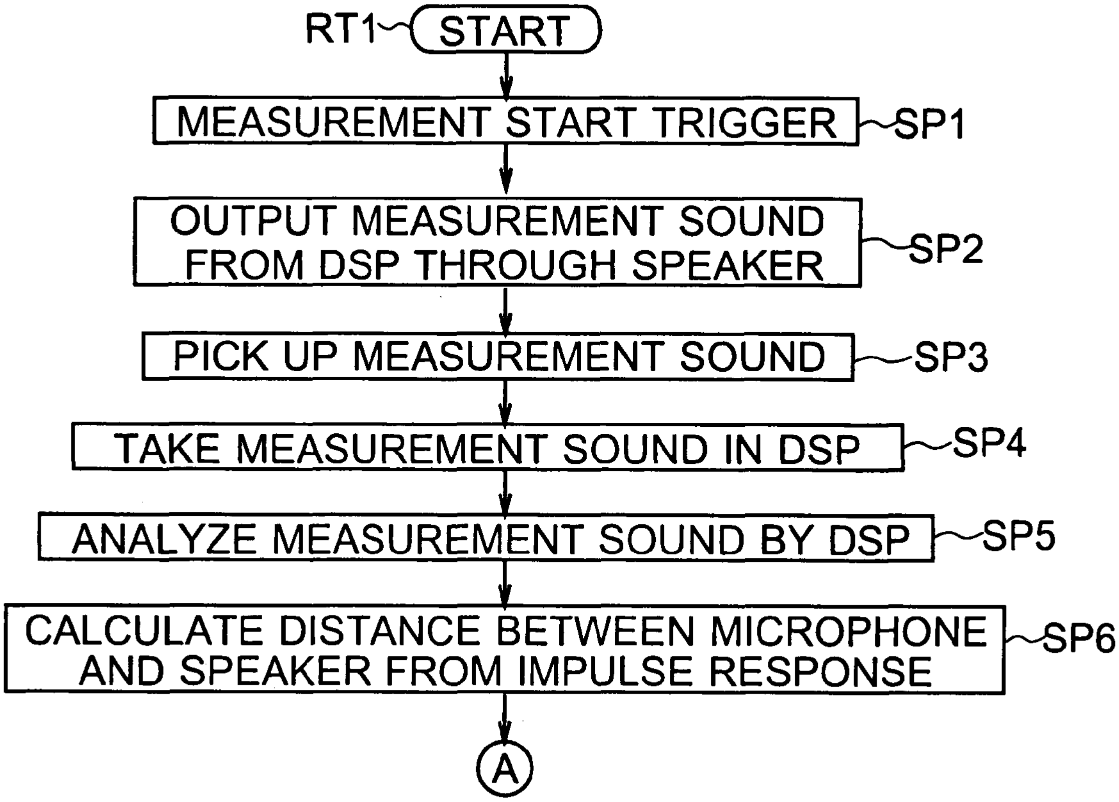
FIGS. 10A and 10B are flowcharts showing a sound field optimum correction processing procedure.
Figure 10B:
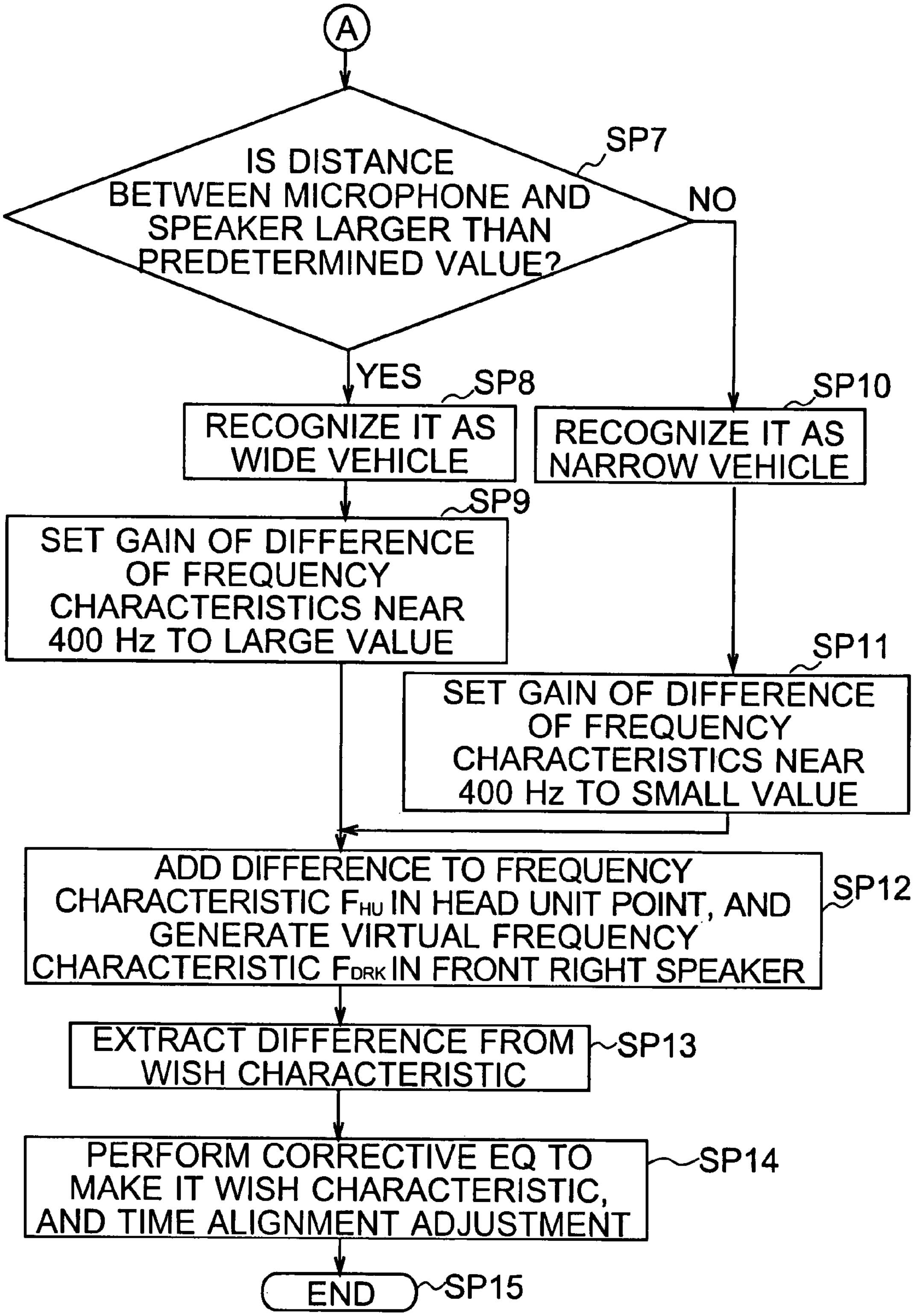

As shown in FIGS. 10A and 10B, the microcomputer 20 of the head unit 3 enters a routine RT1 from a start step, and proceeds to the next step SP1. If that a measurement start trigger for detecting the virtual frequency characteristic fDLK of the front left speaker FL at the driver's listening point LP1 was supplied is recognized responding to an operation to the user interface 22 by a user, the microcomputer 20 proceeds to the next step SP2.

In step SP2, the microcomputer 20 of the head unit 3 emits a measurement sound from the front left speaker FL via the DSP 21. The microcomputer 20 proceeds to the next step SP3 to pick up the measurement sound with the microphone MF1 that is provided as buried in the front panel 3A of the above head unit 3. The microcomputer 20 proceeds to the next step SP4 to take the measurement sound in the DSP 21, and proceeds to the next step sP5.

In step SP5, the microcomputer 20 of the head unit 3 analyzes the measurement sound by the DSP 21 (impulse response analysis processing, Fast Fourier Transform (FFT) processing or the like) to detect the frequency characteristic fHU of the front left speaker FL at the head unit point HP, recognizes it as the virtual frequency characteristic fDLK of the front left speaker FL at the driver's listening point LP1, and proceeds to the next step SP6.

In step SP6, the microcomputer 20 of the head unit 3 calculates a time that the measurement sound emitted from the front left speaker FL reaches the microphone MF1 provided at the head unit point HP of the head unit 3 by impulse response, calculates a distance between the front left speaker FL and the microphone MF1 at the head unit point HP based on the time, and proceeds to the next step SP7.

In step SP7, the microcomputer 20 of the head unit 3 determines whether or not the distance between the front left speaker FL and the microphone MF1 at the head unit point HP is larger than a predetermined threshold value.

If an affirmative result is obtained here, this means that the distance between the front left speaker FL and the microphone MF1 at the head unit point HP is larger than the predetermined threshold value. At this time, the microcomputer 20 of the head unit 3 proceeds to the next step SP8.

In step SP8, the microcomputer 20 of the head unit 3 recognizes that since the distance between the front left speaker FL and the microphone MF1 at the head unit point HP is larger than the predetermined threshold value, the vehicle 1 is a 3 number plate vehicle that is larger than a standard in vehicle width, and proceeds to the next step SP9.

In step SP9, the microcomputer 20 of the head unit 3 sets the gain of a difference of frequency characteristics D near approximately 400 Hz to a larger value as described above, adds this to the frequency characteristic fHU of the front left speaker FL at the head unit point HP and corrects, and then proceeds to the next step SP12.

On the contrary, is a negative result is obtained in step SP7, this means that the distance between the front left speaker FL and the microphone MF1 at the head unit point HP is smaller than the predetermined threshold value. At this time, the microcomputer 20 of the head unit 3 proceeds to the next step SP10.

In step SP10, the microcomputer 20 of the head unit 3 recognizes that since the distance between the front left speaker FL and the microphone MF1 at the head unit point HP is smaller than the predetermined threshold value, the vehicle 1 is a 5 number plate vehicle that is smaller than a standard in vehicle width, and proceeds to the next step SP11.

In step SP11, the microcomputer 20 of the head unit 3 sets the gain of the difference of frequency characteristics D near approximately 400 Hz to a smaller value, adds this to the frequency characteristic fHU of the front left speaker FL at the head unit point HP and corrects, and then proceeds to the next step SP12.

In step SP12, the microcomputer 20 of the head unit 3 sets the gain of the difference of frequency characteristics D that was set in step SP9 or step SP11 to the frequency characteristic fHU of the front left speaker FL at the head unit point HP, that is, the virtual frequency characteristic fDLK of the front left speaker FL at the driver's listening point LP1 or the virtual frequency characteristic fPRK of the front right speaker FR at the passenger's listening point LP2, and adds this. Thereby, the virtual frequency characteristic fDRK of the front right speaker FR at the driver's listening point LP1 or the virtual frequency characteristic fPLK of the front left speaker FL at the passenger's listening point LP2 is generated. Then, the microcomputer 20 proceeds to the next step SP13.

Figure 11:
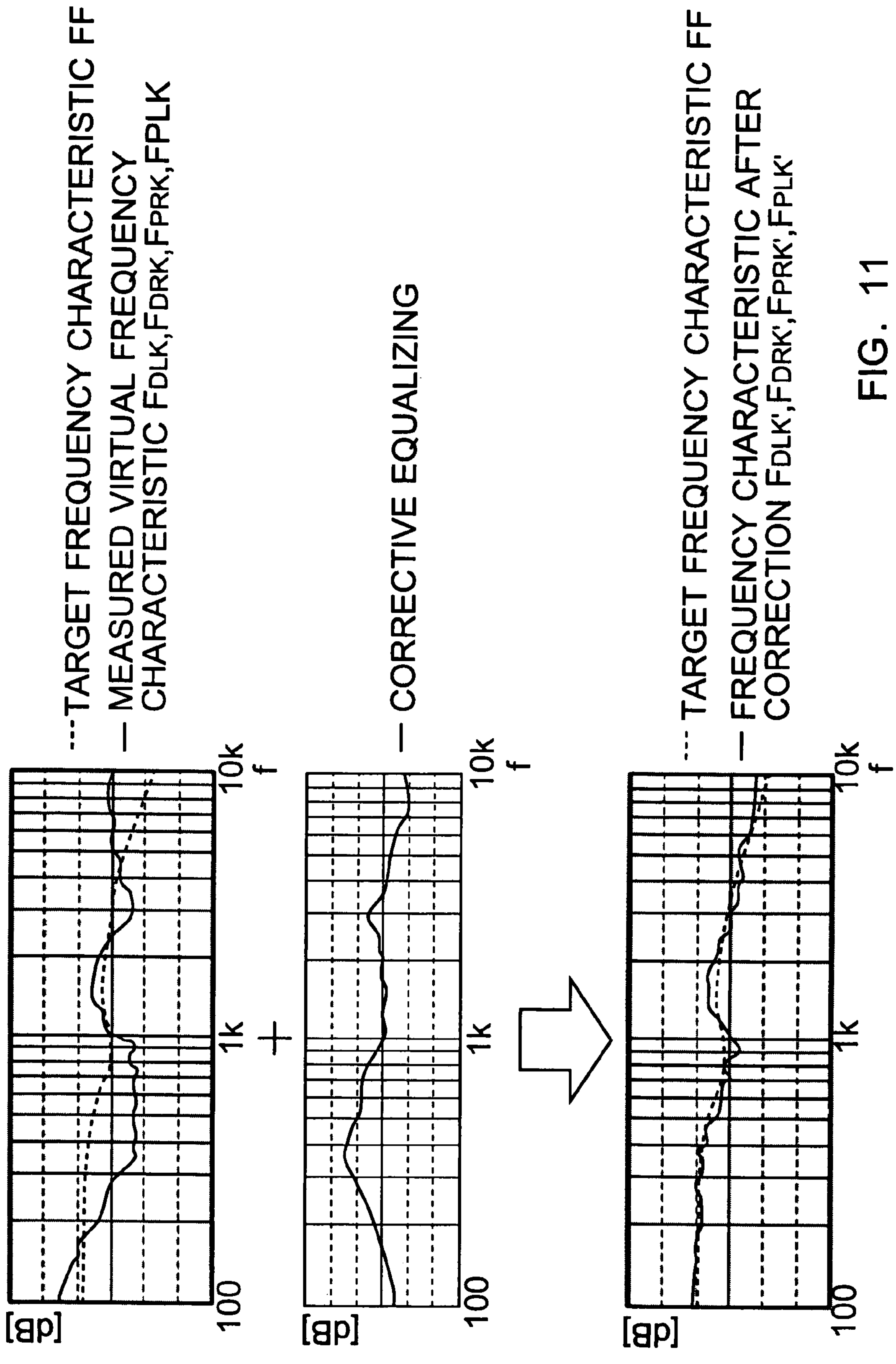
FIG. 11 is a characteristic curvilinear diagram for explaining an example for correcting a frequency characteristic.

In step SP13, as shown in FIG. 11, the microcomputer 20 of the head unit 3 extracts the difference between the frequency characteristic fHU that was obtained by practically measured at the head unit point HP (that is, the virtual frequency characteristic fDLK of the front left speaker FL at the driver's listening point LP1, or the virtual frequency characteristic fPRK of the front right speaker FR at the passenger's listening point LP2) and a target frequency characteristic FF being a target to finally form a sound field space wished by the user, and proceeds to the next step SP14.

Note that, the microcomputer 20 of the head unit 3 also extracts the difference between the virtual frequency characteristic fDRK of the front right speaker FR at the driver's listening point LP1 that was obtained by calculated by the aforementioned calculation based on the frequency characteristic fHU obtained by practically measured at the head unit point HP, and the target frequency characteristic FF being a target to finally form the sound field space wished by the user, and the difference between the virtual frequency characteristic fPLK of the front left speaker FL at the passenger's listening point LP2 and the target frequency characteristic FF, and proceeds to the next step SP14.

In step SP14, the microcomputer 20 of the head unit 3 performs corrective equalizing based on the differences extracted in step SP13 so as to approximate the frequency characteristic to the target frequency characteristic FF, and obtains the final frequency characteristics after correction fDLk', fDRk', fPRk' and fPLk'. At the same time, the microcomputer 20 controls the output timings of sounds by the front left speaker FL and the front right speaker FR to perform time alignment adjustment for properly adjusting the phases, and improves the listening environment at the driver's listening point LP1 and the passenger's listening point LP2. Then, the microcomputer 20 proceeds to the next step SP15 to finish the processing.

(4) Operation and Effect

According to the above configuration, in the sound field optimum correction system 2, measurement sounds from the front left speaker FL and the front right speaker FR are measured by the microphone MF1 for hands free function that is provided as buried in the front panel 3A of the head unit 3. Thereby, the listening environment at the driver's listening point LP1 and the passenger's listening point LP2 can be readily improved, without forcing a user to do troublesome work such as installing a measurement microphone near the headrest H1 of the driver's seat.

Further, in the sound field optimum correction system 2, the frequency characteristic fHU of the head unit point HP obtained by measuring a measurement sound from the front left speaker FL by the microphone MF1 for hands free function in the head unit 3 can be recognized as the virtual frequency characteristic fDLK of the front left speaker FL at the driver's listening point LP1. At the same time, by correcting the above virtual frequency characteristic fDLK by using the difference of frequency characteristics D between the front left speaker FL and the front left speaker FL at the driver's listening point LP1 that was previously correctly calculated, also the virtual frequency characteristic fDRK of the front right speaker FR at the driver's listening point LP1 can be immediately obtained by calculation.

At this time, similarly, in the sound field optimum correction system 2, the frequency characteristic fHU of the head unit point HP can be recognized as the virtual frequency characteristic fPRK of the front right speaker FR at the passenger's listening point LP2. At the same time, by correcting the above virtual frequency characteristic fPRK by using the difference of frequency characteristics D between the front right speaker FR and the front left speaker FL at the passenger's listening point LP2 that was previously correctly calculated, also the virtual frequency characteristic fPLK of the front left speaker FL at the passenger's listening point LP2 can be immediately obtained by calculation.

In this manner, in the sound field optimum correction system 2, the frequency characteristic fHU of the head unit point HP is recognized as the virtual frequency characteristic fDLK of the front left speaker FL at the driver's listening point LP1 and the virtual frequency characteristic fPRK of the front right speaker FR at the passenger's listening point LP2, and the virtual frequency characteristic fDRK of the front right speaker FR at the driver's listening point LP1 and the virtual frequency characteristic fPLK of the front left speaker FL at the passenger's listening point LP2 can be calculated by calculation using the respective differences of frequency characteristics D based on that. Therefore, a virtual frequency characteristic fDRK and a virtual frequency characteristic fPLK which are appropriate and accurate, and do not have peak and dip by standing waves can be obtained than the case of practically measuring.

That is, in the sound field optimum correction system 2, the virtual frequency characteristic fDLK of the front left speaker FL and the virtual frequency characteristic fDRK of the front right speaker FR at the driver's listening point LP1 can be obtained based on the frequency characteristic fHU of the head unit point HP obtained by that a measurement sound from the front left speaker FL is measured rigidly only once by the microphone MF1 for hands free function in the head unit 3. At the same time, the virtual frequency characteristic fPRK of the front right speaker FR and the virtual frequency characteristic fPLK of the front left speaker FL at the passenger's listening point LP2 can be obtained.

Accordingly, in the sound field optimum correction system 2, it can be finished by only once measuring the measurement sound of the front left speaker FL by the microphone MF1 in the head unit 3. Therefore, trouble to a user can be vastly reduced in comparison to conventional one.

Further, in the sound field optimum correction system 2, the frequency characteristic fHU of the head unit point HP is corrected using an accurate difference of frequency characteristics D previously calculated, as well as using the fixed microphone MF1 provided as buried in the front panel 3A of the head unit 3. Thereby, a human error such as an installing error and a measurement error on a measurement microphone as a conventional system can be removed. Therefore, the virtual frequency characteristic fDLK of the front left speaker FL and the virtual frequency characteristic fDRK of the front right speaker FR at the driver's listening point LP1, and the virtual frequency characteristic fPRK of the front right speaker FR and the virtual frequency characteristic fPLK of the front left speaker FL at the passenger's listening point LP2 can be obtained further accurately.

Then, the sound field optimum correction system 2 performs corrective equalizing and time alignment adjustment based on such highly accurate virtual frequency characteristic fDLK of the front left speaker FL and such highly accurate virtual frequency characteristic fDRK of the front right speaker FR at the driver's listening point LP1 with high accuracy. Thereby, the driver's listening point LP1 can be readily and highly accurately improved into the listening environment desired by a user.

Similarly, the sound field optimum correction system 2 performs corrective equalizing and time alignment adjustment based on such highly accurate virtual frequency characteristic fPRK of the front right speaker FR and such highly accurate virtual frequency characteristic fPLK of the front left speaker FL at the passenger's listening point LP2. Thereby, the passenger's listening point LP2 can be readily and highly accurately improved into the listening environment desired by the user.

According to the above configuration, the sound field optimum correction system 2 is mounted in a vehicle 1 having a similar vehicle space irrespective of vehicle type. Therefore, virtual frequency characteristics fDLK, fDRK, fPRK and fPLK at the driver's listening point LP1 and the passenger's listening point LP2 can be obtained with high accuracy, in a simple structure and less number of times of measurement, by using the common characteristics and the particular characteristic in the vehicle space, and the listening environment can be improved by using it. Thus, the sound field in the vehicle can be further readily, optimally and highly accurately corrected without forcing a user to do troublesome work.

(5) Other Embodiments

In the aforementioned embodiment, it has dealt with the case where the sound field optimum correction system 2 in a two-channel configuration of the front right speaker FR and the front left speaker FL is used. However, the present invention is not only limited to this but also a sound field optimum correction system in a four channel configuration in that a rear right speaker and a rear left speaker are added other than the front right speaker FR and the front left speaker FL, or in a multi-channel configuration having more speakers may be used.

Figure 12:
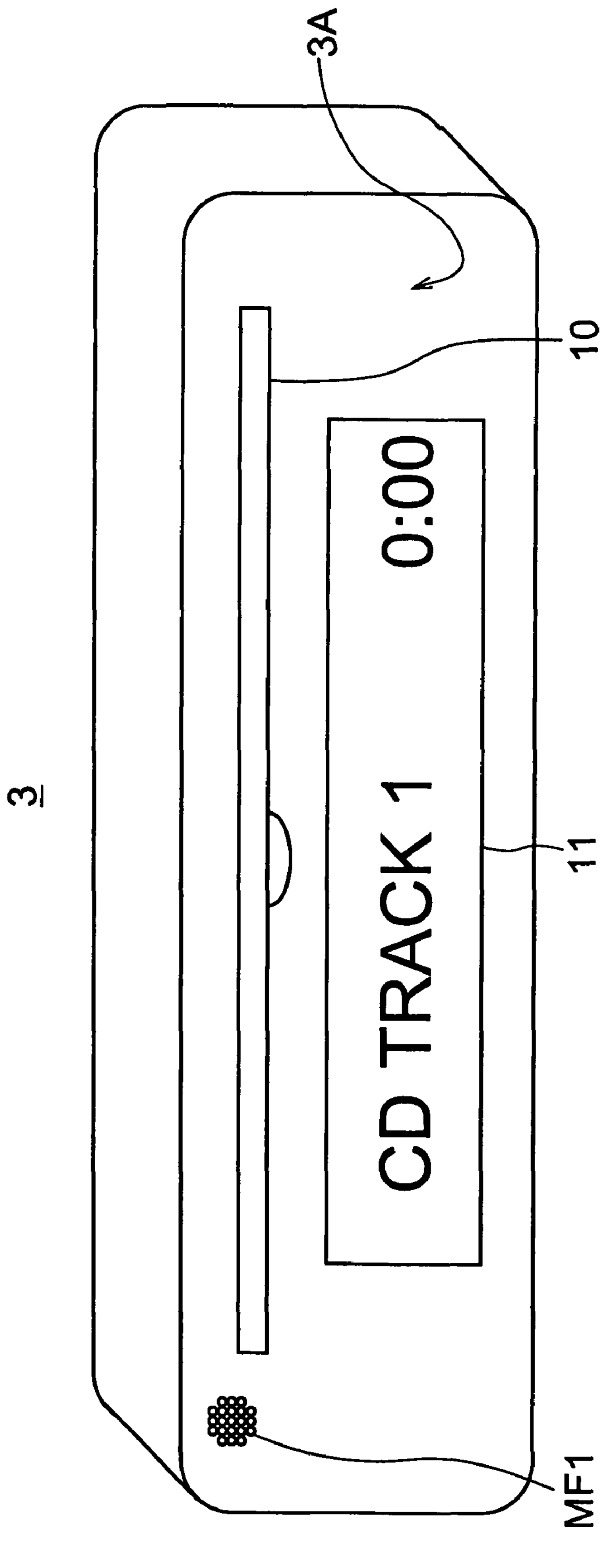
FIG. 12 is a schematic perspective view showing the configuration of a head unit in other embodiment.

In the aforementioned embodiment, it has dealt with the case where sound field correction in a vehicle is performed using the nondirective microphone MF1 for hands free function provided as buried at the almost center upper part of the front panel 3A of the head unit 3. However, the present invention is not only limited to this but also as shown in FIG. 12, sound field correction in a vehicle may be performed using a microphone MF1 provided as buried at the left upper part of the front panel 3A of the head unit 3. Similarly, sound field correction in a vehicle space may be performed using a microphone MF1 provided as buried at the right upper part of the front panel 3A of the head unit 3.

Further, in the aforementioned embodiment, it has dealt with the case where the frequency characteristic fHU of a measurement sound reaching from the front left speaker FL or the front right speaker FR to the microphone MF1 of the head unit 3 is measured, and the listening environment at the driver's listening point LP1 and the passenger's listening point LP2 is improved by using the measurement result. However, the present invention is not only limited to this but also it may be that the head unit 3 is attached to the almost center of a rear right seat and a rear left seat, the frequency characteristics of an audio sound reaching from a rear left speaker and a rear right speaker to the microphone MF1 of the head unit 3 are measured, and the listening environment at a rear right seat listening point and a rear left seat listening point is improved by using the measurement result.

Further, in the aforementioned embodiment, it has dealt with the case where the virtual frequency characteristic fDLK of the front left speaker FL and the virtual frequency characteristic fDRK of the front right speaker FR at the driver's listening point LP1 are obtained, and also the virtual frequency characteristic fPRK of the front right speaker FR and the virtual frequency characteristic fPLK of the front left speaker FL at the passenger's listening point LP2 are obtained, based on the frequency characteristic fHU of the head unit point HP obtained by only once measuring a measurement sound from the front left speaker FL by the microphone MF1 for hands free function of the head unit 3. However, the present invention is not only limited to this but also it may be that the virtual frequency characteristic fPRK of the front right speaker FR and the virtual frequency characteristic fPLK of the front left speaker FL at the passenger's listening point LP2 are obtained, and also the virtual frequency characteristic fDLK of the front left speaker FL and the virtual frequency characteristic fDRK of the front right speaker FR at the driver's listening point LP1 are obtained, based on the frequency characteristic fHU of the head unit point HP obtained by only once measuring a measurement sound from the front right speaker FR by the microphone MF1 for hands free function of the head unit 3.

Further, in the aforementioned embodiment, it has dealt with the case where in the view from the front left speaker FL, the above front left speaker FL is attached to a door on the passenger seat side so that the head unit point HP of the head unit 3 and the driver's listening point LP1 of the headrest H1 become in a symmetrical positional relationship, and in the view from the front right speaker FR, the above front right speaker FR is attached to a door on the driver's seat side so that the head unit point HP of the head unit 3 and the passenger's listening point LP2 become in a symmetrical positional relationship. However, the present invention is not only limited to this but also if the frequency characteristic fHU measured at the head unit point HP is almost approximate to the virtual frequency characteristic fDLK, fPRK that will be measured at the driver's listening point LP1 or the passenger's listening point LP2, the positions of the front left speaker FL and the front right speaker FR are not limited to them. In the view from the front left speaker FL and the front right speaker FR, they may be attached to slightly shifted positions that they are not exactly in a symmetrical positional relationship.

Further, in the aforementioned embodiment, it has dealt with the case where the head unit 3 serving as electronic apparatus for vehicle is formed by the microphone MF1 serving as pickup means, the microcomputer 20 and the DSP 21 serving as control means. However, the present invention is not only limited to this but also electronic apparatus for vehicle may be formed by pickup means and control means having other various configurations.

According to an embodiment of the present invention, electronic apparatus for vehicle, a method for optimally correcting a sound field in a vehicle, and a sound field optimum correction system in a vehicle in that by using a tendency for that the frequency characteristic of an audio sound picked up with the microphone provided on the front panel of the electronic apparatus for vehicle is almost approximate to the virtual frequency characteristic of an audio sound that will reach from the left speaker or the right speaker to the listening point assumed on the front of the headrest, the virtual frequency characteristic of the sound that will reach from the left speaker or the right speaker to the listening point assumed on the front of the headrest can be corrected, only by correcting the frequency characteristic of the sound picked up with the above microphone, so that the virtual frequency characteristic of an audio sound at the listening point assumed on the front of the headrest can be arbitrary adjusted, without forcing a user to do troublesome work can be realized.

While there has been described in connection with the preferred embodiments of the present invention, it will be obvious to those skilled in the art that various changes, modifications, combinations, sub-combinations and alternations may be aimed, therefore, to cover in the appended claims all such changes, and modifications as fall within the true spirit and scope of the present invention.

What is claimed is:

1. An electronic apparatus configured to be attached to a front console panel of a vehicle located substantially between a driver's seat and a passenger seat, the apparatus comprising:

a microphone including sound pickup means configured to pick up an audio sound emitted through a front left speaker or a front right speaker, consistent with a listening point found on a front of a head rest of the driver's seat or the passenger seat; and control means for correcting the frequency characteristic of the audio sound, based on the assumption that a frequency characteristic of the audio sound reaching the microphone from the front left or the front right speaker is approximate to a frequency characteristic of the audio sound reaching the listening point from the front left speaker or the front right speaker; and wherein the control means calculates a distance between the microphone and the front left or front right speaker, and determines whether the distance is greater than a predetermined threshold value;

wherein the predetermined threshold value includes a standard vehicle width.

2. The electronic apparatus according to claim 1, wherein:

the control means sets the gain of a difference of frequency characteristics to a larger value and adds this to the frequency characteristic if the distance is greater than the predetermined threshold value.

3. The electronic apparatus according to claim 1, wherein:

the control means sets the gain of a difference of frequency characteristics to a smaller value and adds this to the frequency characteristic of if the distance is smaller than the predetermined threshold value.

4. The electronic apparatus according to claim 2, wherein the gain of a difference of frequency characteristics near approximately 400 Hz is set to a larger value.

5. The electronic apparatus according to claim 3, wherein the gain of a difference of frequency characteristics near approximately 400 Hz is set to a smaller value.

6. The electronic apparatus according to claim 2, wherein the control means extracts the difference between the frequency characteristic and a target frequency characteristic desired by a user.

7. The electronic apparatus according to claim 3, wherein the control means extracts the difference between the frequency characteristic and a target frequency characteristic desired by a user.

8. The electronic apparatus according to claim 6, wherein the control means performs corrective equalizing to the frequency characteristic based on the difference between the frequency characteristic and the target frequency characteristic desired by a user.

9. The electronic apparatus according to claim 7, wherein the control means performs corrective equalizing to the frequency characteristic based on the difference between the frequency characteristic and the target frequency characteristic desired by a user.

10. The electronic apparatus according to claim 1, wherein the microphone is a nondirective microphone.

11. A method for correcting a sound field in a vehicle, comprising the steps of:

picking up an audio sound emitted through a front left speaker or a front right speaker, consistent with a listening point found on a front of a head rest of a driver's seat or a passenger seat in the vehicle;

correcting the frequency characteristic of the audio sound, based on the assumption that a frequency characteristic of the audio sound reaching the microphone from the front left or the front right speaker is approximate to a frequency characteristic of the audio sound reaching the listening point from the front left speaker or the front right speaker; and calculating a distance between the microphone and the front left or front right speaker, and determining whether the distance greater than a predetermined threshold value;

wherein the predetermined threshold value includes a standard vehicle width.

12. A sound field correction system for use in a vehicle, comprising:

an electronic apparatus attached to a front console panel located between a driver's seat and a passenger seat;

a front left speaker and a front right speaker;

wherein said electronic apparatus includes:

a microphone including sound pickup means configured to pick up an audio sound emitted through the front left speaker or the front right speaker consistent with a listening point found on a front of a head rest of the driver's seat or the passenger seat in the vehicle; and control means for correcting the frequency characteristic of the audio sound, based on the assumption that a frequency characteristic of the audio sound reaching the microphone from the front left or the front right speaker is approximate to a frequency characteristic of the audio sound reaching the listening point from the front left speaker or the front right speaker;

wherein the control means calculates a distance between the microphone and the front left or front right speaker, and determining whether the distance greater than a predetermined threshold value; and wherein the predetermined threshold value includes a standard vehicle width.

* * * * *